US011101121B2

(12) United States Patent
Hasegawa et al.

(10) Patent No.: US 11,101,121 B2
(45) Date of Patent: Aug. 24, 2021

(54) SAMPLE FRAGMENTATION DEVICE USING HEATING AND PRESSURE REGULATION BETWEEN SAMPLE INJECTOR AND SEPARATION COLUMN

(71) Applicant: HITACHI HIGH-TECHNOLOGIES CORPORATION, Tokyo (JP)

(72) Inventors: Hideki Hasegawa, Tokyo (JP); Shun Kumano, Tokyo (JP); Yuichiro Hashimoto, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 0 days.

(21) Appl. No.: 15/568,529

(22) PCT Filed: Mar. 30, 2016

(86) PCT No.: PCT/JP2016/060579
§ 371 (c)(1),
(2) Date: Oct. 23, 2017

(87) PCT Pub. No.: WO2016/185807
PCT Pub. Date: Nov. 24, 2016

(65) Prior Publication Data
US 2018/0114682 A1    Apr. 26, 2018

(30) Foreign Application Priority Data
May 19, 2015    (JP) .............................. JP2015-102037

(51) Int. Cl.
*H01J 49/00*    (2006.01)
*G01N 30/30*    (2006.01)
(Continued)

(52) U.S. Cl.
CPC .......... *H01J 49/0045* (2013.01); *G01N 30/30* (2013.01); *G01N 30/32* (2013.01); *H01J 49/0468* (2013.01); *G01N 30/54* (2013.01)

(58) Field of Classification Search
None
See application file for complete search history.

(56) References Cited

U.S. PATENT DOCUMENTS 4,774,190 A * 9/1988 Weiss ..................... G01N 30/88
                                                        210/656
5,808,178 A * 9/1998 Rounbehler ........... G01N 30/30
                                                        73/23.35
(Continued)

FOREIGN PATENT DOCUMENTS

JP    2002-14080 A    1/2002
JP    2003-331776 A   11/2003
JP    2008-89576 A    4/2008

OTHER PUBLICATIONS

Wang, et al., "On-Probe Pyrolysis Desorption Electrospray Ionization (DESI) Mass Spectrometry for the Analysis of Non-Volatile Pyrolysis Products", J. Anal. Appl. Pyrolysis. Jan. 10, 2007; 80(2), pp. 353-359

(Continued)

*Primary Examiner* — James Choi
(74) *Attorney, Agent, or Firm* — Mattingly & Malur, PC

(57) ABSTRACT

For increasing a speed of fragmentation of a sample, such as a protein and a peptide, to enhance introduction efficiency into a detector, such as a mass spectrometer, a liquid feeding pump 2, a sample injector 3, and a separation column 6 that are connected via pipes are included, and further, a heating unit 4 for heating a pipe between the sample injector 3 and the separation column 6, and a pressure regulating unit 5 provided between the heating unit 4 and the separation (Continued)

column 6 for regulating the inner pressure of the pipe heated by the heating unit 4, are included.

5 Claims, 15 Drawing Sheets

(51) Int. Cl.
G01N 30/32 (2006.01)
H01J 49/04 (2006.01)
G01N 30/54 (2006.01)

(56) References Cited

U.S. PATENT DOCUMENTS

| 5,954,860 | A * | 9/1999 | Gordon | G01N 30/12 95/87 |
|---|---|---|---|---|
| 6,354,136 | B1 * | 3/2002 | Bremer | G01N 30/30 210/198.2 |
| 6,456,095 | B1 * | 9/2002 | Sorita | H01J 49/0422 250/221 |
| 6,547,852 | B2 * | 4/2003 | Ledford, Jr. | G01N 30/30 95/87 |
| 7,490,506 | B2 * | 2/2009 | Chaintreau | G01N 30/463 73/23.35 |
| 8,999,245 | B2 * | 4/2015 | Wang | G01N 30/30 422/70 |
| 2002/0189447 | A1 * | 12/2002 | Thordarson | G01N 30/18 95/82 |
| 2003/0085714 | A1 * | 5/2003 | Keyes | G01N 27/626 324/464 |
| 2003/0209666 | A1 * | 11/2003 | Hirabayashi | H01J 49/0404 250/288 |
| 2009/0039250 | A1 * | 2/2009 | Ishimaru | G01N 30/461 250/288 |
| 2011/0232366 | A1 * | 9/2011 | Guan | G01N 30/465 73/23.42 |
| 2012/0011919 | A1 * | 1/2012 | Kriel | G01N 30/88 73/23.35 |
| 2012/0126113 | A1 * | 5/2012 | Tao | G01N 30/722 250/288 |

OTHER PUBLICATIONS

Chen, et al., "High Pressure Super-Heated Electrospray Ionization Mass Spectrometry for Sub-Critical Aqueous Solution", J. Am. Soc. Mass Spectrom. (2014) 25; pp. 1862-1869.
International Search Report of PCT/JP2016/060579 dated May 24, 2016.
Japanese Office Action received in corresponding Japanese Application No. 2015-102037 dated Dec. 18, 2018.

* cited by examiner (A)

(B)

(A)

(B)

UNIT (%)

|  | MOBILE PHASE A | MOBILE PHASE B |
|---|---|---|
| (1) ADSORPTION STEP | 100 | 0 |
| (2) ELUTION STEP | 0 | 100 |
| (3) WASHING STEP | 100 | 0 |

※ MOBILE PHASE A: 0.1% AQUEOUS ACETIC ACID
MOBILE PHASE B: 0.1% ACETIC ACID-CONTAINING METHANOL

SAMPLE FRAGMENTATION DEVICE USING HEATING AND PRESSURE REGULATION BETWEEN SAMPLE INJECTOR AND SEPARATION COLUMN

TECHNICAL FIELD

The present invention relates to a sample fragmentation device for fragmenting a sample, such as a protein and a peptide, on line to introduce the fragmented sample into a detector.

BACKGROUND ART

When a protein or a peptide having a large molecular weight is analyzed by a mass spectrometer, a method in which the protein or peptide is fragmented into peptides with a digestive enzyme, such as trypsin, as a pretreatment, followed by ionization is generally used. The trypsin digestion selectively cuts peptide bonds in special amino acids, such as lysine and arginine, through hydrolysis, and is therefore highly appreciated. On the other hand, there is however a problem, such as the reaction time being half a day or longer in some cases.

For solving the problem, a technique in NPL 1 is known. In NPL 1, a sample, such as a protein, on a glass substrate is heated to undergo pyrolysis, followed by ionization by desorption electrospray ionization (DESI). This technique makes it possible to degrade a protein under a condition of 220 to 250° C. in a short period of time of approximately 10 seconds.

As an alternative technique of degradation by heat, a technique of NPL 2 is known. In NPL 2, a sample solution is introduced into an ionization unit held at a high pressure and a high temperature, followed by ionization by electrospray ionization (ESI) (high pressure ESI). Since a boiling point of a liquid increases under high pressure, in a case of water, for example, water does not boil even when the temperature exceeds 100° C. Water is thus not lost, making it possible to achieve fragmentation by hydrolysis.

CITATION LIST

Non Patent Literature

NPL 1: Zhang S et al., J. Anal. Appl. Pyrolysis. 2007; 80: 353-359; On-probe pyrolysis desorption electrospray ionization (DESI) mass spectrometry for the analysis of non-volatile pyrolysis products.

NPL 2: Chen et al., J. AM. Soc. Mass Spectrom. (2014); High pressure super-heated electrospray ionization mass spectrometry for subcritical aqueous solution.

SUMMARY OF INVENTION

Technical Problem

In the method of NPL 1, since water also vaporizes with heat, the sample does not undergo hydrolysis as in trypsin digestion, but collapses randomly from a part sensitive to heat, and therefore reproducibility of the degradation may be deteriorated, making it difficult to identify the degradation products.

On the other hand, in the method of NPL 2, a first pore electrode primary side (ionization unit) which acts as an introduction port of the mass spectrometer is under high pressure, and therefore, the inner pressure of the mass spectrometer cannot be maintained at an optimal value unless the diameter of the pore of the first pore electrode is small. The small pore size leads to reduction of the ion introduction amount, resulting in deterioration of sensitivity.

Solution to Problem

The sample fragmentation device according to the present invention includes a liquid feeding pump, a sample injector, and a separation column that are connected via pipes, a heating unit for heating a pipe between the sample injector and the separation column, and a pressure regulating unit provided between the heating unit and the separation column for regulating the inner pressure of the pipe heated by the heating unit.

Advantageous Effects of Invention

According to the present invention, it is possible to fragment a sample, such as a protein and a peptide, on line in a short period of time without reducing introduction efficiency into a detector, such as a mass spectrometer.

Other problems, configurations, and effects than the above will be apparent from the following explanation of the embodiments.

DESCRIPTION OF EMBODIMENTS

Embodiments of the present invention will be explained with reference to drawings.

EXAMPLE 1

Figure 1:
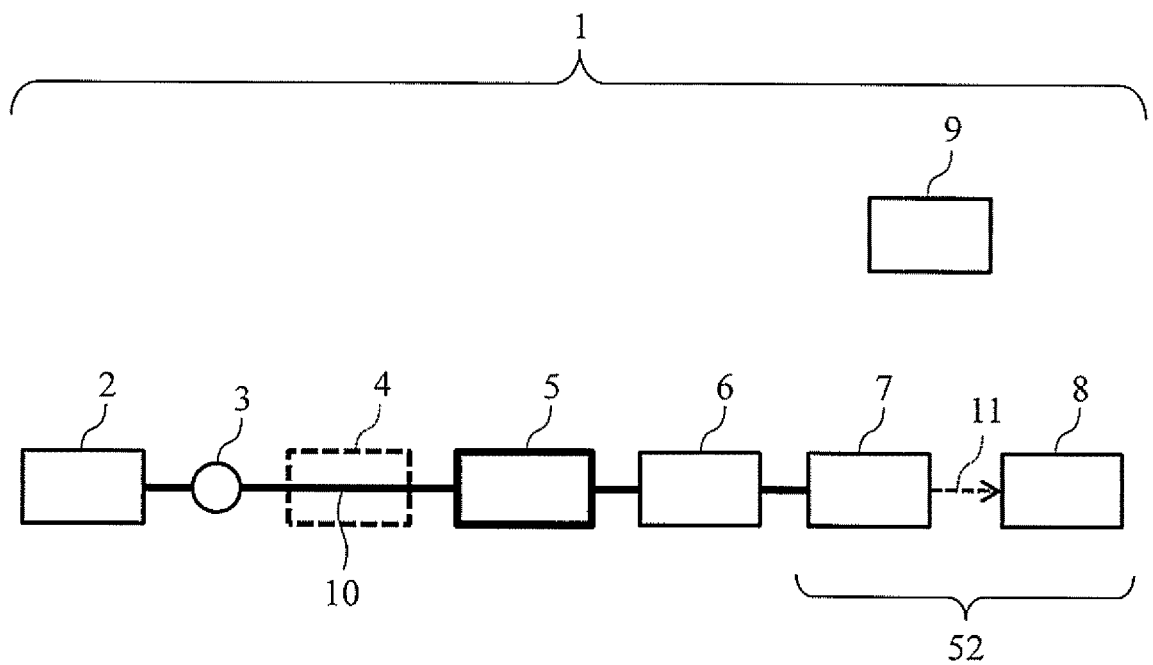
FIG. 1 is a schematic diagram showing a configuration example of the sample fragmentation device.

FIG. 1 is a schematic diagram showing a configuration example of a sample fragmentation device of Example 1. In this example, a configuration of a sample fragmentation device including a pressure regulating unit between a heated pipe and a separation column in a flow path system will be explained. An example in which a mass spectrometer is used as a detector is shown here.

A sample fragmentation device 1 includes a liquid feeding pump 2, a sample injector 3, a heating unit 4, a pressure regulating unit 5, a separation column 6, and a detector 52, which are connected via pipes. A sample introduced from the sample injector 3 is allowed to pass through the inside of the separation column 6 by the liquid feeding pump 2 and the sample separated by the separation column 6 is analyzed by the detector 52. The detector 52 of this example is composed of an ion source 7 and a mass spectrometer 8. The sample is ionized by the ion source 7, ions 11 thus produced are detected by the mass spectrometer 8, and the masses of the ions are analyzed. The sample is separated temporally by liquid chromatography with a packing packed in the separation column 6, and then, the ions 11 are subjected to mass spectroscopy, whereby removal of impurities and analysis with high accuracy and high S/N can be achieved. In the liquid chromatography, generally, the packing of the separation column 6 is called a stationary phase, and a solution allowed to flow through the separation column 6 is called a mobile phase. The sample can be separated by taking advantage of a difference in hydrophobic interaction between the sample contained in the mobile phase and the stationary phase.

The principle of the sample separation will be explained with an example of a technique called reversed phase chromatography from among techniques of liquid chromatography. The reversed phase chromatography is characterized in that the mobile phase has a higher polarity than the stationary phase. For instance, a high-polarity solvent, such as water, methanol, and acetonitrile, is used as the mobile phase and a hydrophobic packing obtained by chemically bonding an octadecyl group to silica (referred to as ODS or C18) and the like is used as the stationary phase. Adsorption of a sample onto a hydrophobic stationary phase, such as ODS, is mainly performed by feeding a mobile phase constituted of a solution, such as water, having a small elution force, and elution of a sample from the stationary phase is mainly performed by feeding a mobile phase constituted of a solution, such as an organic solvent, having a large elution force. In addition, there is a technique called gradient analysis in which a concentration of an organic solvent having a large elution force is gradually varied in elution, thereby eluting a sample component having a higher polarity earlier. Since the retention time in a separation column differs for each component in the sample depending on the hydrophobic interaction of the component in such a step of adsorption and elution, it is possible to separate the sample temporally.

The sample fragmentation device 1 shown in FIG. 1 is characterized by including the heated pipe 10 heated by the heating unit 4 between the sample injector 3 and the separation column 6, and further including the pressure regulating unit 5 between the heating unit 4 and the separation column 6.

In addition, the sample fragmentation device 1 includes a controlling unit 9, and in the controlling unit 9, analysis and dissection of results obtained by the mass spectrometer 8 are performed. In practice, based on the masses of ions detected, the sample structure is identified and the amounts of components in the sample are quantified. The controlling unit 9 also performs operation control, condition settings, and the like, of the liquid feeding pump 2, the sample injector 3, the heating unit 4, the pressure regulating unit 5, the ion source 7, and the mass spectrometer 8. The controlling unit 9 may also have a function to store characteristic data of the separation column 6 used in an analysis. By storing characteristic data of the separation column 6, the conditions of the retention time and liquid-feeding pressure of the separation column 6 can be reflected on the next analysis and the data dissection.

Figure 2:
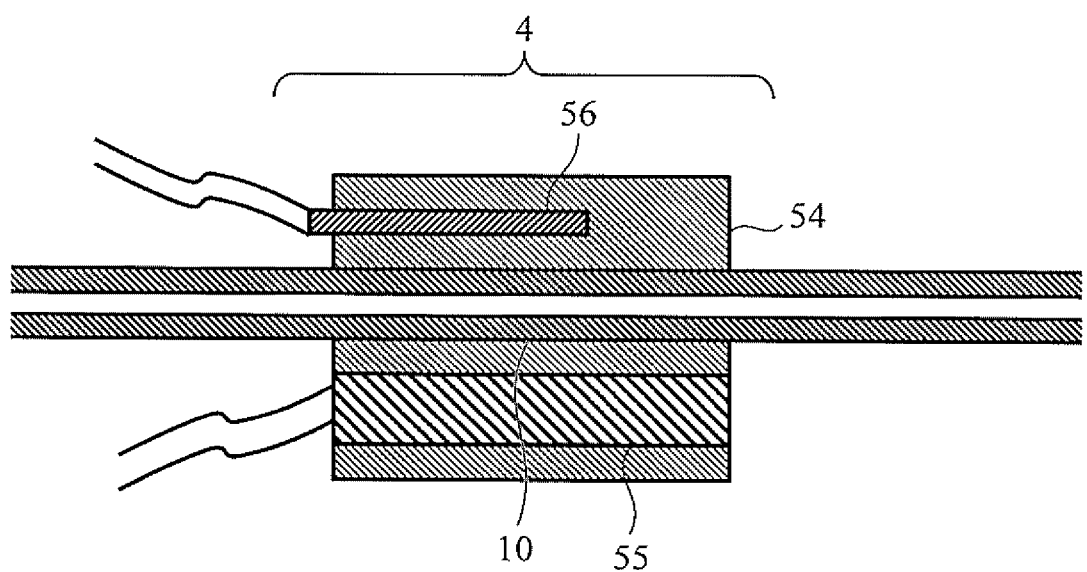
FIG. 2 is a cross-sectional schematic diagram showing a configuration example of the heating unit.

FIG. 2 is a cross-sectional schematic diagram showing a configuration example of the heating unit 4. A heating block 54 is placed around the heated pipe 10. The heating block 54 is heated by a heater 55 and the temperature thereof is measured by a thermocouple 56. The output power of the heater 55 is controlled by the controlling unit 9 based on the temperature measured by the thermocouple 56, whereby the temperature of the heating block 54 can be controlled. Incidentally, the same effect can be achieved by, besides the heating block 54, any means that can conduct a temperature to the heated pipe 10, such as a configuration as in, for example, a water jacket in which the heated pipe 10 passes through a temperature-regulated liquid and a configuration in which an electrically-heated wire is wound around the heated pipe 10. As the heater 55, various heaters, such as a cartridge heater and a plate heater, can be used. In addition, for measuring the temperature, besides the thermocouple, a resistance temperature detector and the like can be used.

As the ion source 7, an ion source of various techniques, such as an electrospray ionization (ESI) and an atmospheric pressure chemical ionization (APCI), can be used.

As the mass spectrometer 8, a mass spectrometer of various techniques, such as a triple-quadrupole mass spectrometer (QqQ) and a time-of-flight mass spectrometer (TOF), can be used.

In the sample fragmentation device 1 shown in FIG. 1, since a mobile phase is allowed to pass through the separation column 6 charged with a high-density packing by the liquid feeding pump 2, the upstream side of the separation column 6 becomes under high pressure. Since a boiling point of a liquid increases under high pressure, the liquid does not boil even at a boiling point under the atmospheric pressure (100° C. in the case of water). In other words, the boiling point of the mobile phase on the upstream side of the separation column 6 increases. The vapor pressure of a solvent is represented by Formula 1.

[Formula 1]

$$\text{Log}_{10} P = A - \frac{B}{T+C} \quad (1)$$

Formula 1 is referred to as Antoine equation, and P is a vapor pressure (mmHg), T is a temperature (° C.), and A, B, and C are Antoine constants. As a mobile phase that is generally used in a liquid chromatograph mass spectrometer in many cases, an example of 0.1% aqueous acetic acid and 0.1% acetic acid-containing methanol will be explained here. Antoine constants A, B, and C depend on a substance, and A=8.028, B=1706, and C=231.4 for water, A=8.079, B=1581, and C=239.7 for methanol, and A=7.560, B=1644, and C=233.5 for acetic acid. A vapor pressure of a mixed solution is represented by Formula 2.

[Formula 2]

$$P_{Total} = \sum_i P_i \cdot x_i \quad (2)$$

Figure 3:
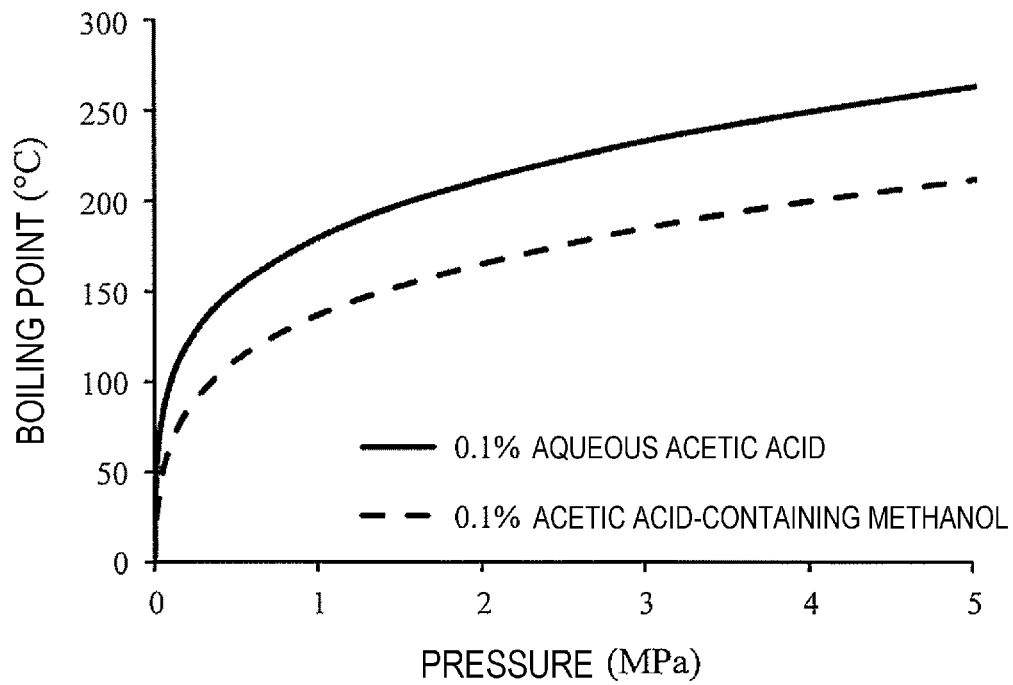
FIG. 3 is a graph showing relations between pressure and boiling point of solutions.

Formula 2 is satisfied under Raoult's law, and $P_{Total}$ is a vapor pressure of the mixed solution, $P_i$ is a vapor pressure of each component as a pure liquid, and $x_i$ is a molar fraction. FIG. 3 is a graph showing relations between pressure and boiling point of 0.1% aqueous acetic acid and 0.1% acetic acid-containing methanol obtained from Formula 1 and Formula 2. The theoretical value for 0.1% aqueous acetic acid is shown by a solid line, and the theoretical value for 0.1% acetic acid-containing methanol is shown by a dashed line. It can be understood from FIG. 3 that increase of the pressure of a solution leads to increase of the boiling point.

Accordingly, in this example, even when the heated pipe 10 is heated to a temperature of the boiling point of a mobile phase under the atmospheric pressure or higher, the liquid does not boil. In other words, vaporization by boiling does not occur and thus water is not lost, and therefore, even under a temperature as high as the boiling point of the mobile phase under the atmospheric pressure or higher, the condition may be a condition that a sample such as a protein can be hydrolyzed. When a sample can be hydrolyzed, sample fragmentation with high reproducibility can be realized. In addition, in the device configuration shown in FIG. 1, the downstream side of the separation column 6 is under the atmospheric pressure. Thus, even when the ion introduction port of the mass spectrometer 8 is not made small, the inner pressure of the mass spectrometer 8 can be maintained at an optimal value, and the amount of ions introduced is not reduced.

Figure 4:
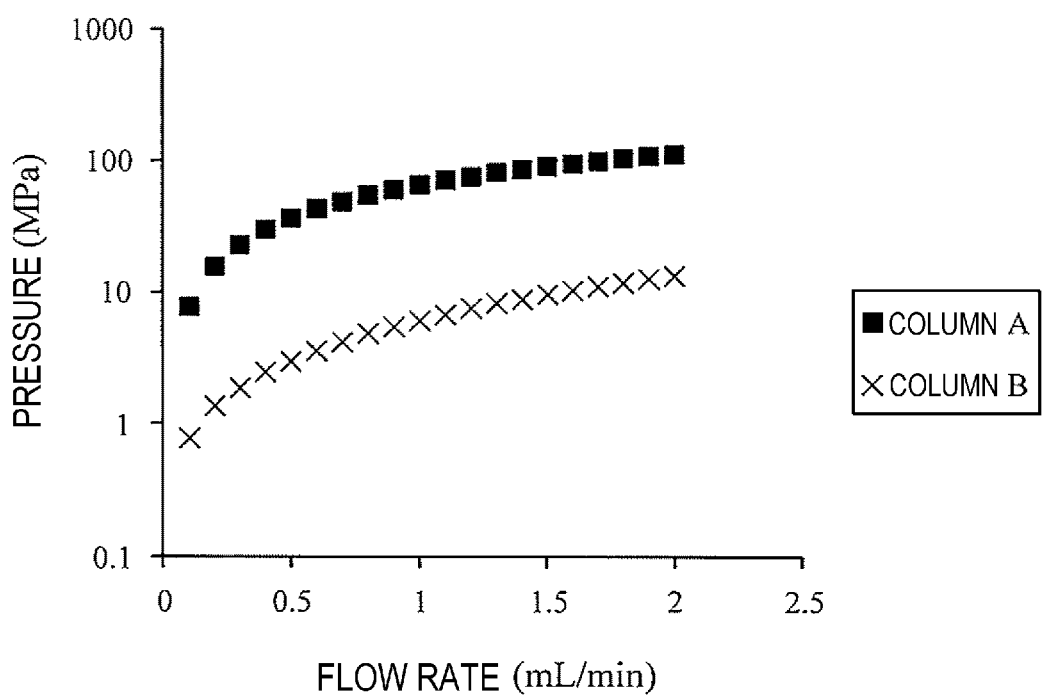
FIG. 4 is a graph showing relations between flow rate and column-upstream-side pressure depending on the kind of the column.

FIG. 4 is a diagram showing experimental results of relations between flow rate and pressure of the upstream side of a separation column when 100% of water is allowed to flow through two kinds of separation columns. The experimental values of column A are represented by square markers and experimental values of column B are represented by cross markers. Column A and column B are different in conductance due to differences in length and particle size of the packing. Accordingly, even when water of the same flow amount is allowed to flow, the pressures on the upstream side are largely different as shown in FIG. 4. For example, in the case where the inner diameter of the heated pipe 10 is 0.5 mm and the length thereof is 0.85 m, assuming that a sufficient heating time for degradation is approximately 30 seconds, the flow rate has to be approximately 0.4 mL/min. In the case of the condition of 0.4 mL/min of flow rate, the upstream side pressures of the column A and column B are approximately 30 MPa and 2.5 MPa, respectively. With the assumption that the temperature condition may be as high as approximately 250° C. depending on the sample in some cases, when the pressure is set to 5 MPa or more with a margin with respect to the result of FIG. 4, a flow rate of 0.8 mL/min is required for the column B according to FIG. 3 and FIG. 4, the time of passing through the heated pipe 10 is approximately 10 seconds, leading to insufficient heating. Even though the retention time of the solution can be increased by increasing the inner diameter or the length of the heated pipe 10, a problem of adsorption or the like may arise.

Accordingly, even when the pressure regulating unit 5, such as a valve, as shown in FIG. 1 is placed in the flow path and the separation column 6, such as column B, is used, it is essential that the pressure inside the heated pipe 10 be sufficiently high. By regulating variably the conductance in the flow path according to the separation column 6 used, the pressure inside the heated pipe 10 can be maintained at an optimal value (hydrolyzable condition). Incidentally, as the pressure regulating unit 5, a valve such as a needle valve, a member on the pipe having a high flow path resistance, such as a separation column and a capillary, and the like may be used.

EXAMPLE 2

Figure 5:
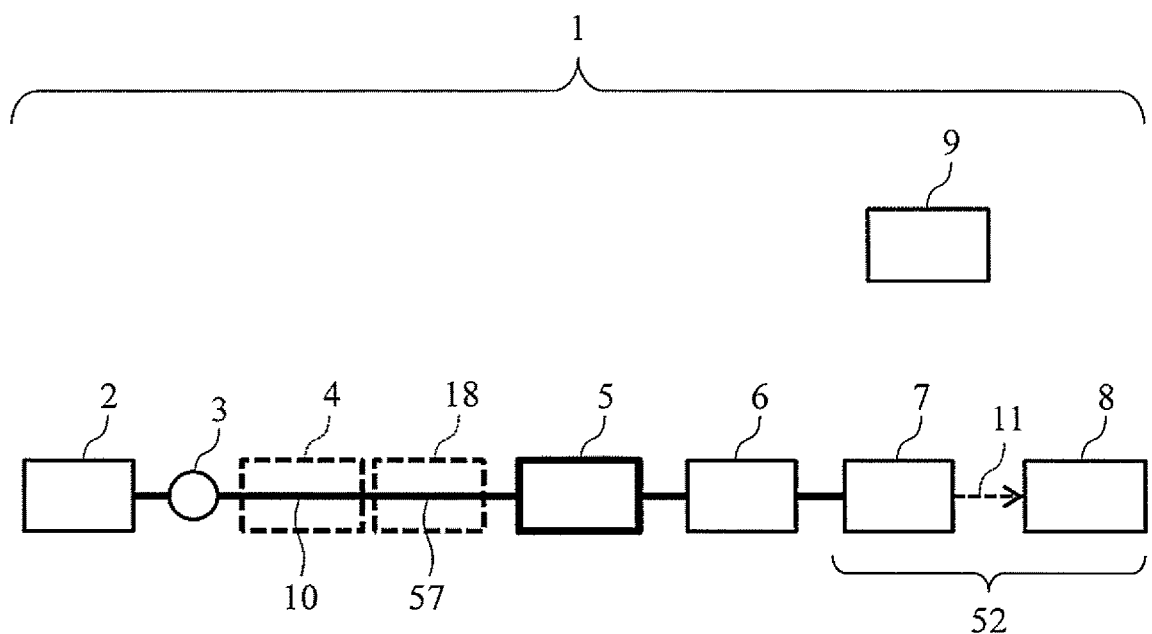
FIG. 5 is a schematic diagram showing a configuration example of the sample fragmentation device.

FIG. 5 is a schematic diagram showing a configuration example of a sample fragmentation device according to Example 2. In this example, a configuration of a sample fragmentation device including a cooling unit 18 between the heating unit 4 and the separation column 6 in a flow path system will be explained.

In the device configuration of FIG. 1, when a mobile phase heated in the heated pipe 10 is introduced as it is into the separation column 6, not only does the packing in the separation column suffer an adverse effect, but the mobile phase also boils instantaneously when the separation column 6 is opened to the atmospheric pressure at the outlet, which may adversely affect stabilization of the subsequent ionization. Accordingly, it is desirable that there is the cooling unit 18 for cooling a pipe 57 at the downstream side of the heated pipe 10 heated by the heating unit 4, as shown in FIG. 5.

Figure 6:
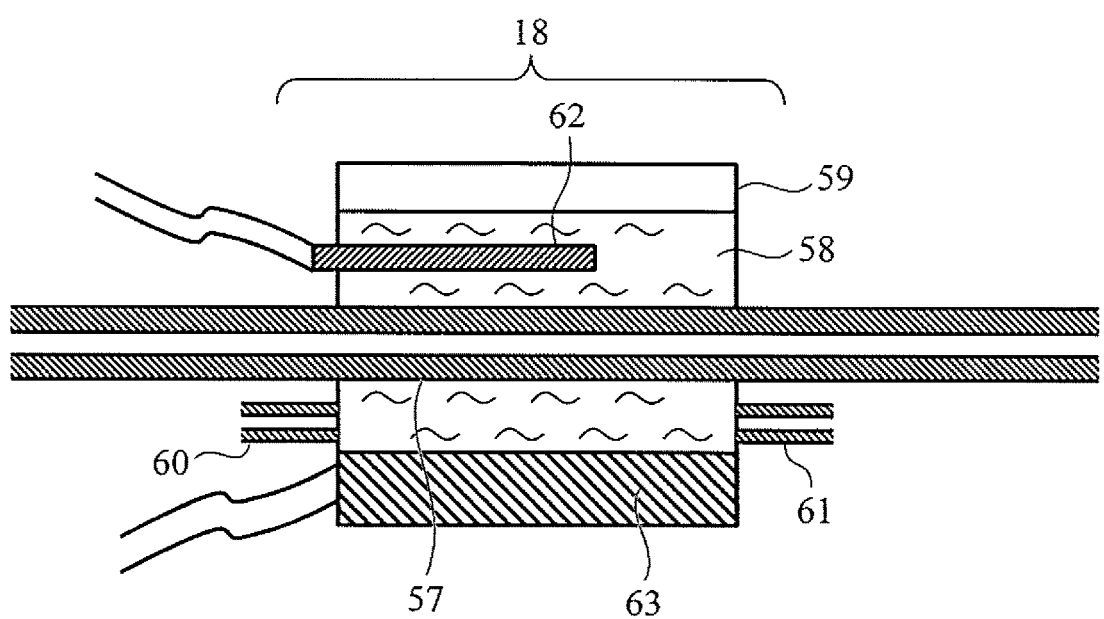
FIG. 6 is a cross-sectional schematic diagram showing a configuration example of the cooling unit.

FIG. 6 is a cross-sectional schematic diagram showing a configuration example of the cooling unit 18. The cooling unit 18 includes around the pipe 57 a container 59 that can be filled with a liquid 58 such as water. The cooling unit 18 has an inlet 60 and an outlet 61 for circulating the liquid 58 for cooling in the container 59, whereby the pipe 57 is cooled in a manner as in a water jacket. The temperature of the liquid 58 is measured by a thermocouple 62. In addition, for preventing the temperature of the liquid 58 from excessively decreasing, a heater 63 may be placed. The output power of the heater 63 is controlled by the controlling unit 9 based on the temperature measured by the thermocouple 62, thereby making it possible to control the temperature of the liquid 58. Incidentally, the same effect can be achieved by any other means than the illustrated structure, such as a cooling block, a Peltier device, and a fan, as long as it can cool the pipe 57. Various heaters, such as a cartridge heater and a plate heater, may be used as the heater 63. In addition, for the temperature measurement, other apparatus than the thermocouple, such as a resistance temperature detector, may be used.

Since liquid chromatography is typically accompanied by the use of a separation column at a temperature in the range from a room temperature to several tens of degrees, the preset temperature of the cooling unit 18 is also desirably set at a temperature from a room temperature to several tens of degrees. Since the preset temperature of the separation column may depend on the purpose of the analysis or the object to be measured, the preset temperature of the cooling unit 18 can be changed according to the various kinds of analysis.

Next, a result of fragmentation by actually degrading a protein using the sample fragmentation device shown in FIG. 5 will be explained.

Figure 7:
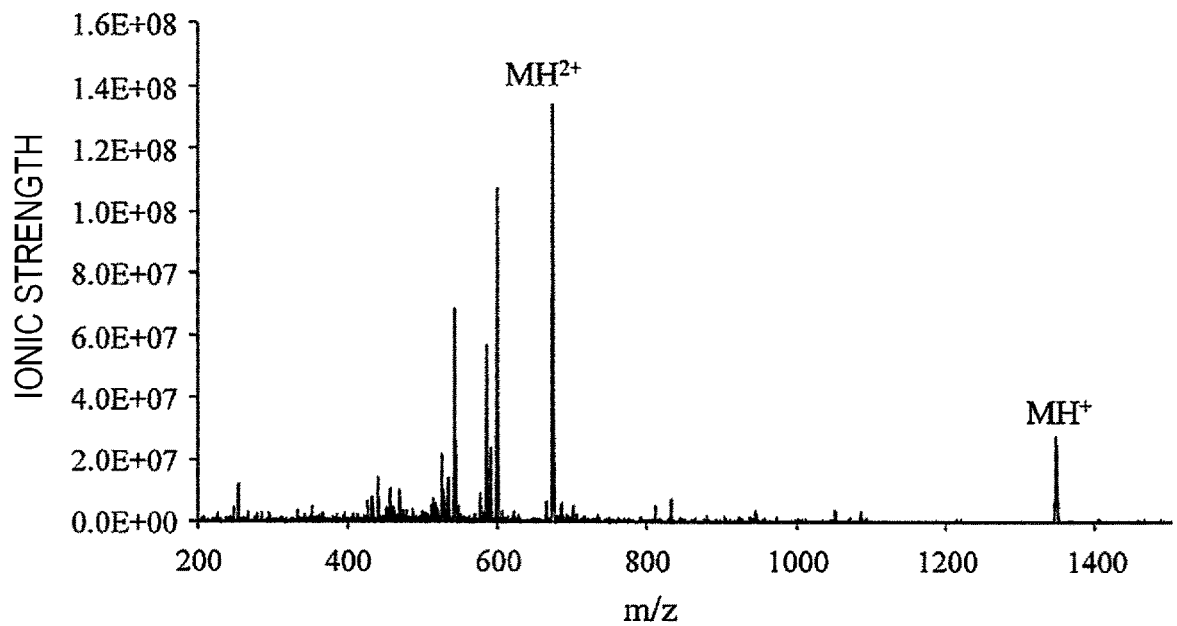
FIG. 7 is charts showing analysis results of substance P.
Figure 7:
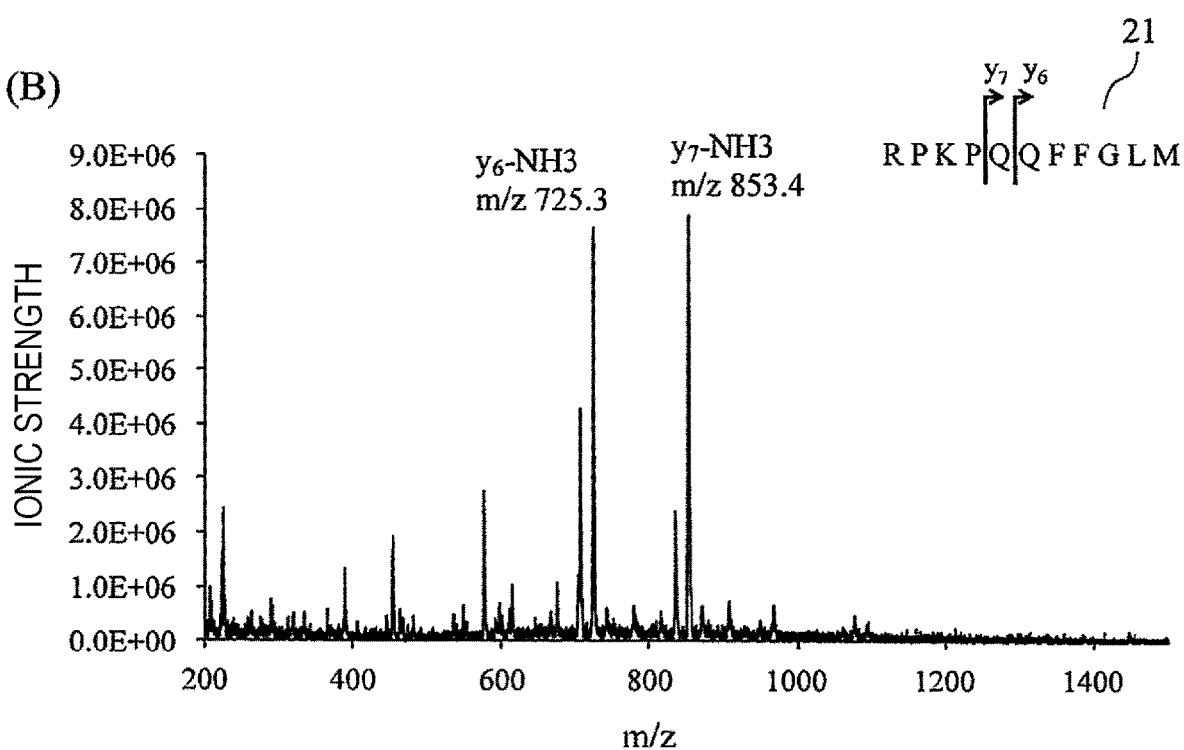

FIG. 7 is charts showing analysis results of substance P (molecular weight 1347). FIG. 7(A) shows a mass spectrum before degradation of substance P, and FIG. 7(B) shows a mass spectrum after degradation of substance P. FIG. 7(A) shows an analysis result when the temperature of the heated pipe 10 was regulated at 80° C., and FIG. 7(B) shows an analysis result when the temperature was regulated at 220° C. As for the experimental conditions, the upstream side pressure of the separation column 6 is 3.5 MPa, and the time for the mobile phase to pass through the heated pipe 10 is 30 seconds. In addition, in adsorption of the sample on the separation column 6, 0.1% aqueous acetic acid was used as a mobile phase, and in elution of the sample, 0.1% acetic acid-containing methanol was used. The use of the sample fragmentation device of this example enabled detection of fragment ions of y6 and y7 derived from substance P. The degradation sites by heating were shown in an amino acid sequence 21 of substance P.

Figure 8:
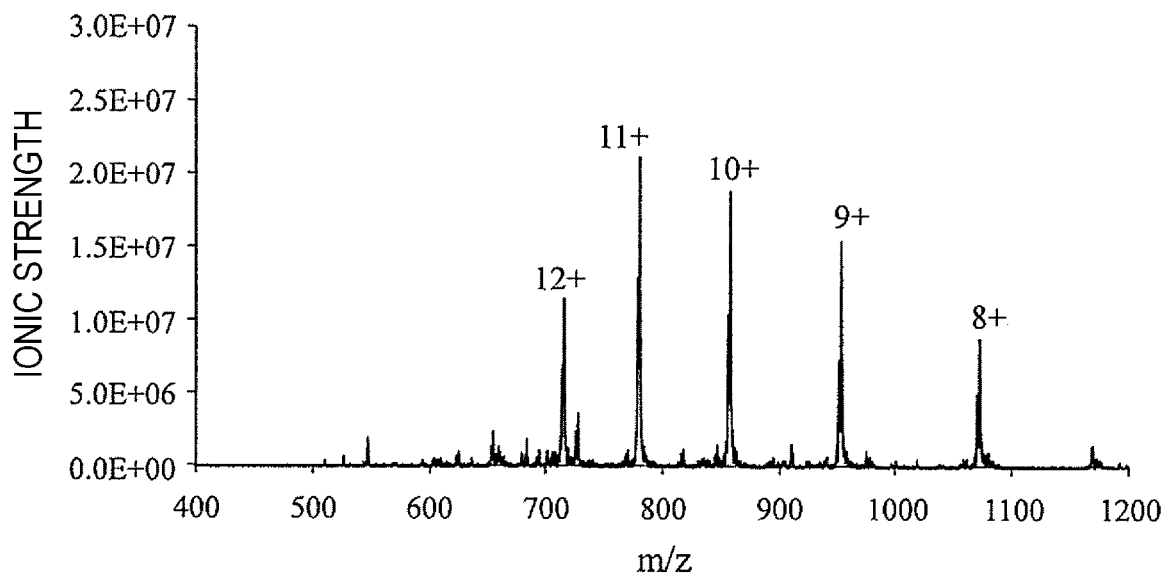
FIG. 8 is charts showing analysis results of ubiquitin.
Figure 8:
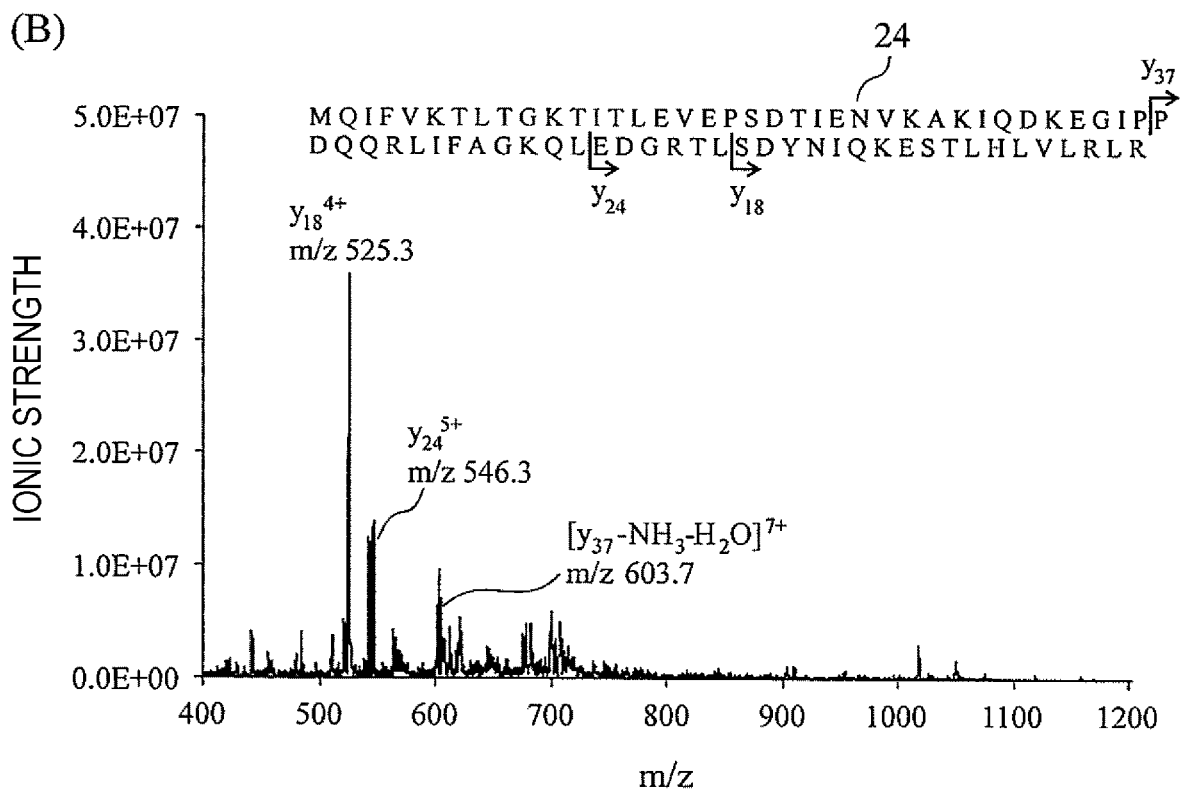

FIG. 8 is charts showing analysis results of ubiquitin (molecular weight 8560). FIG. 8(A) shows a mass spectrum before degradation of ubiquitin, and FIG. 8(B) shows a mass spectrum after degradation of ubiquitin. FIG. 8(A) is an analysis result when the temperature of the heated pipe 10 was regulated at 80° C., and FIG. 8(B) is an analysis result when the temperature was regulated at 180° C. As for the experimental condition, the upstream side pressure of the separation column 6 is 1.6 MPa, and the time for the mobile phase to pass through the heated pipe 10 is 30 seconds. In addition, in adsorption of the sample on the separation column 6, 0.1% aqueous acetic acid was used as a mobile phase, and in elution of the sample, 0.1% acetic acid-containing methanol was used. The use of the sample fragmentation device of this example enabled detection of fragment ions of y18, y24, and y37 derived from ubiquitin. The degradation sites by heating were shown in an amino acid sequence 24 of ubiquitin.

Figure 9:
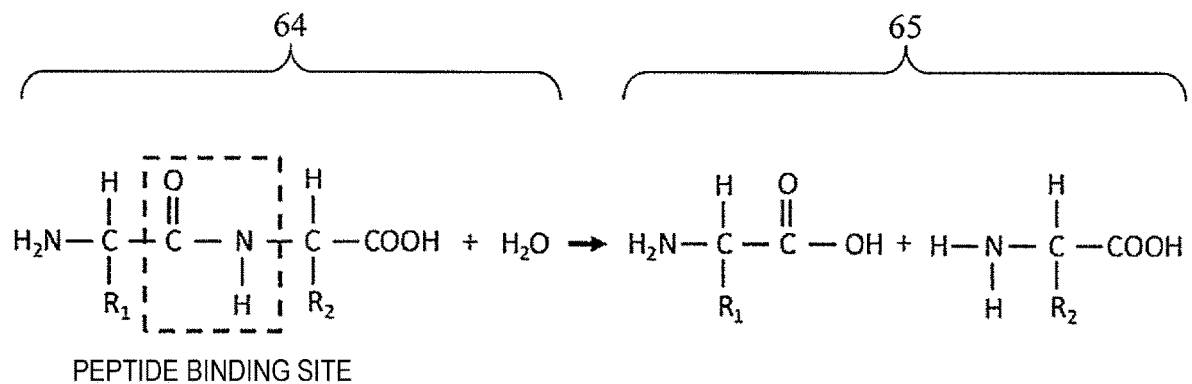
FIG. 9 is a diagram explaining hydrolysis of a protein using structural formulae.

FIG. 9 is a diagram explaining hydrolysis of a protein using structural formulae. By taking in water ($H_2O$), the peptide binding sites in a protein 64 before hydrolysis are cut and the protein 64 is degraded, as shown in a protein 65 after degradation. Since the y-series of ions derived from a fragment produced by cutting a peptide binding site is detected in both the analysis results of substance P and ubiquitin, it was found that hydrolysis in a short period of time can be achieved by this example.

It was found from the above results that by this example, hydrolysis with high reproducibility occurs and special amino acid sequences can be cut. In addition, provision of the cooling unit 18 on the downstream side of the heated pipe 10 heated by the heating unit 4 enabled a stable analysis.

EXAMPLE 3

Figure 10:
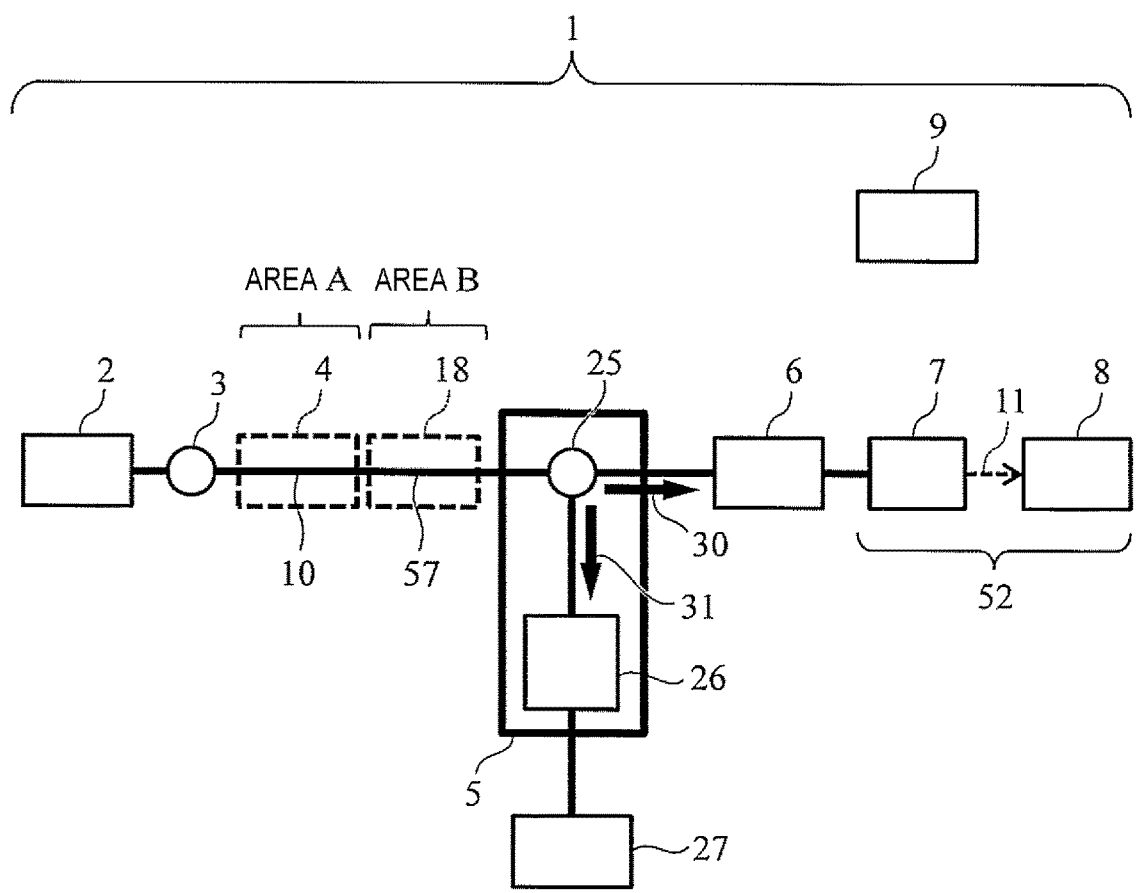
FIG. 10 is a schematic diagram showing a configuration example of the sample fragmentation device.

FIG. 10 is a schematic diagram showing a configuration example of the sample fragmentation device 1 of Example 3. In this example, a configuration of a sample fragmentation device in which in a flow path system, a flow path between the heating unit 4 and the separation column 6 is divided to regulate a pressure, will be explained.

Figures 11, 12:
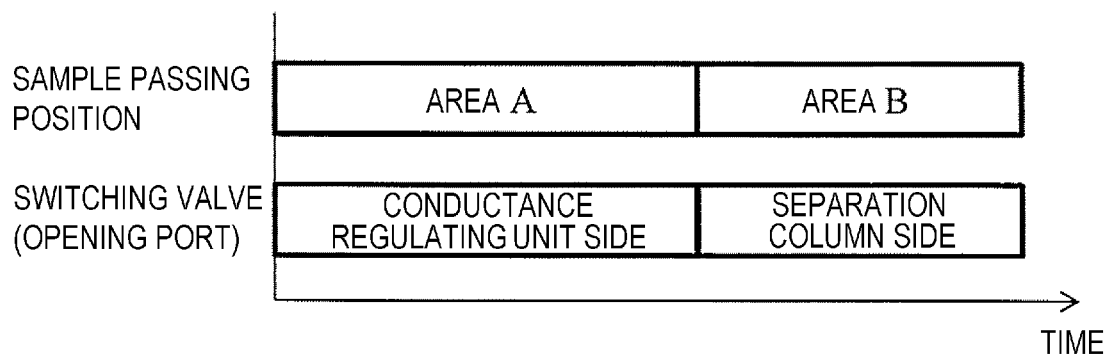
FIG. 11 is a diagram showing a time sequence of an analysis.
FIG. 12 is a table showing an example of an experimental condition used in liquid chromatography.

The device configuration shown in FIG. 10 is almost the same as those in FIG. 1 and FIG. 5, and thus the explanation will be made only for the differences. The configuration of FIG. 10 is characterized by including a flow path selector valve 25 and a flow path conductance regulating unit 26 in the pressure regulating unit 5. By placing the flow path selector valve 25 before the separation column 6, a flow path connected subsequently to the heating unit 4 can be switched to the separation column 6 side or the conductance regulating unit 26 side. In the case of using a column having a different conductance as shown in FIG. 4 or other cases where the inner pressure of the heated pipe 10 is required to be changed, control according to a time sequence as shown in FIG. 11 can be conducted. At the time when a sample passes through an area A (interior of the heated pipe 10), the flow path selector valve 25 opens a port on the conductance regulating unit 26 side to allow a mobile phase to flow in the direction of an arrow 31. In this time, by regulating the inner pressure of the heated pipe 10 by the conductance regulating unit 26, an optimal condition for hydrolyzing a protein or the like can be set. The mobile phase flowing in the arrow 31 direction passes through the conductance regulating unit 26 and is discarded into a discarding unit 27.

After that, at the time when the sample passes through an area B (flow path between the heated pipe 10 and the pressure regulating unit 5), the flow path selector valve 25 opens a port of the separation column 6 side to allow the mobile phase to flow in the direction of an arrow 30. The mobile phase flowing in the arrow 30 direction contains sample components such as the protein fragmented by hydrolysis, and the sample components are adsorbed on a stationary phase of the separation column 6. The sample components adsorbed are eluted in a subsequent elution step, and ionized by the ion source 7, and the ions 11 produced are detected by the mass spectrometer 8.

By switching the flow path connected to the heating unit 4, that is, the opening port of the flow path selector valve 25 between the separation column 6 and the conductance regulating unit 26 depending on the elapsed time from the start of feeding the sample by the liquid feeding pump 2 in this manner, only at the time when the sample passes through the area A (interior of the heated pipe 10), the pressure can be controlled to an optimal condition for hydrolysis. With this technique, the pressure of the time when hydrolysis occurs in the heated pipe 10 is not applied on the separation column 6, and therefore, an unnecessary pressure other than the pressure required for sample separation is not applied on the separation column 6. Thus, the service life of the separation column 6 is extended.

EXAMPLE 4

In Example 4, a configuration of a sample fragmentation device in which in a flow path system, a flow path between a heated pipe and a separation column is switched to feed a mobile phase from different flow paths between an adsorption step and an elution step will be explained.

FIG. 12 is a diagram showing an example of an experimental condition used in liquid chromatography. In the experimental condition shown in FIG. 12, 100% of a mobile phase A (0.1% aqueous acetic acid) is allowed to flow in an adsorption step, 100% of a mobile phase B (0.1% acetic acid-containing methanol) is allowed to flow in an elution step, and 100% of the mobile phase A is allowed to flow in a washing step. The ratio of the mobile phase A and the mobile phase B is generally appropriately changed depending on the sample subjected to the analysis or the kind of the separation column. In addition, as for the solvent used, similarly, another solvent such as acetonitrile may be used, and other substance than acetic acid, such as formic acid, may be added, depending on the purpose.

Next, a problem in sample elution from the separation column 6 with 0.1% acetic acid-containing methanol, as in the example of the experimental condition shown in FIG. 12, will be explained. As shown in FIG. 3, 0.1% aqueous acetic acid and 0.1% acetic acid-containing methanol have boiling points largely different from each other under the same pressure condition. For example, it can be seen from FIG. 3 that the boiling points at 0.8 MPa are 170° C. and 130° C., respectively. This means that when the adsorption step and the elution step are conducted under the same pressure and temperature conditions, under the experimental conditions in FIG. 12, boiling more easily occurs in the elution step in which the mobile phase B is used. Since hydrolysis occurs before the adsorption step onto the separation column 6 in this example, it is essential to prevent boiling of the mobile phase until the adsorption step. On the other hand, the need in the elution step will be explained below.

Figure 13:
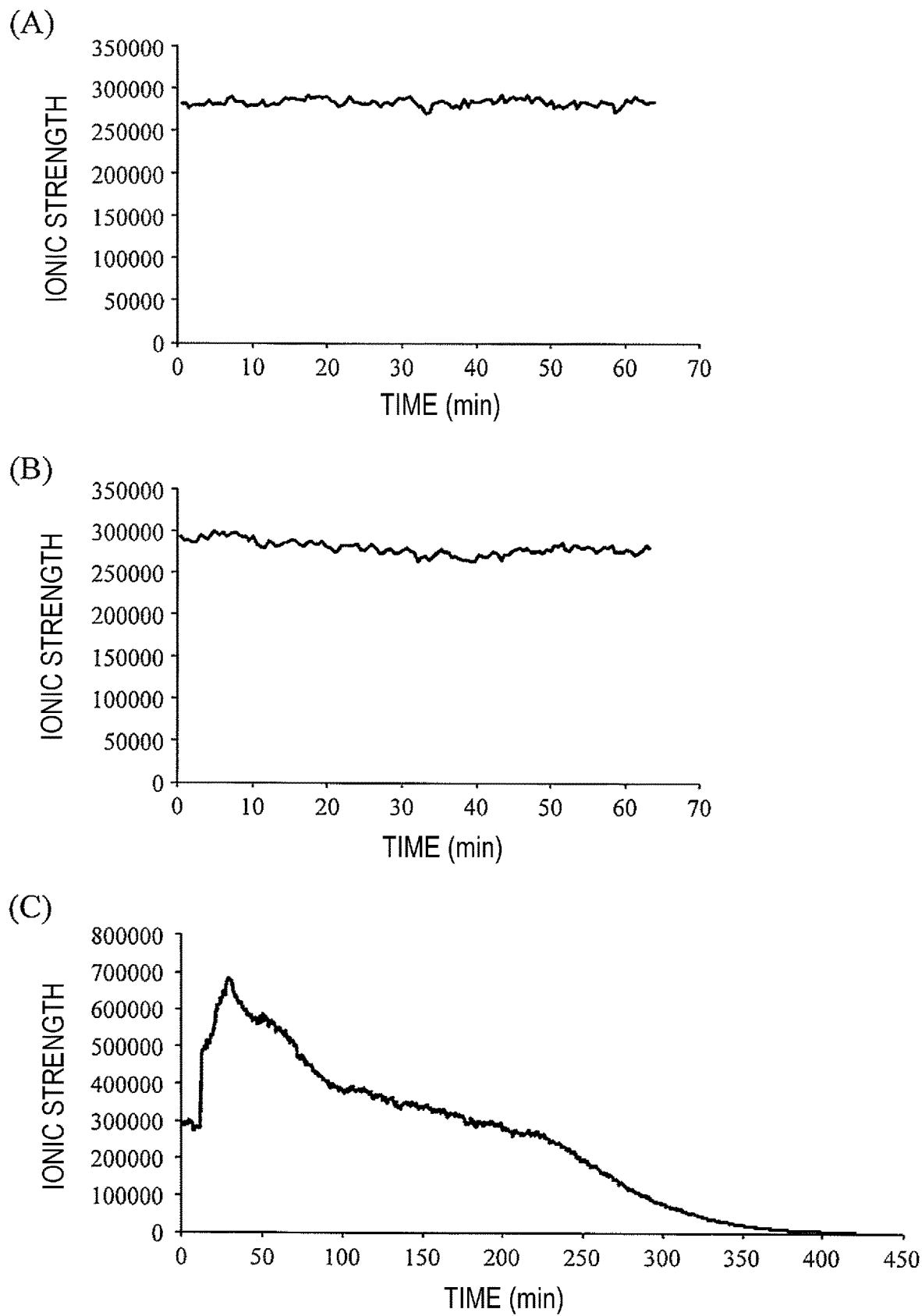
FIG. 13 is graphs showing a relation between temperature of the heated pipe and stability of ionic strength.

In the device configuration shown in FIG. 5, a sample of reserpine dissolved in a methanol solvent (concentration 1 ppb) was fed to the separation column 6 by continuous liquid feeding (infusion) at 100 μL/min, and ionized by the ion source 7 (ESI method), and the ions 11 produced were analyzed by the mass spectrometer 8. The analysis results are shown in FIG. 13. The mass spectrometer 8 used was a triple-quadrupole mass spectrometer (QqQ), and a multiple reaction monitoring (MRM) mode was used. FIG. 13 shows experimental results when the MRM was set to m/z 609→m/z 195. FIG. 13(A) shows an experimental result when the temperature of the heated pipe 10 was a room temperature, FIG. 13(B) shows an experimental result in the case of 90° C., and FIG. 13(C) shows an experimental result in the case of 100° C.

In FIG. 13(A) (room temperature) and FIG. 13(B) (90° C.), a stable ionic strength over time is shown (coefficient of variation CV=several % or less), but in FIG. 13(C) (100° C.), the ionic strength significantly varies. This is caused by boiling of the methanol solution, and when the adsorption step and the elution step are conducted at the same pressure and temperature conditions as in the configuration of FIG. 5, stability in measurement may be impaired.

Figure 14:
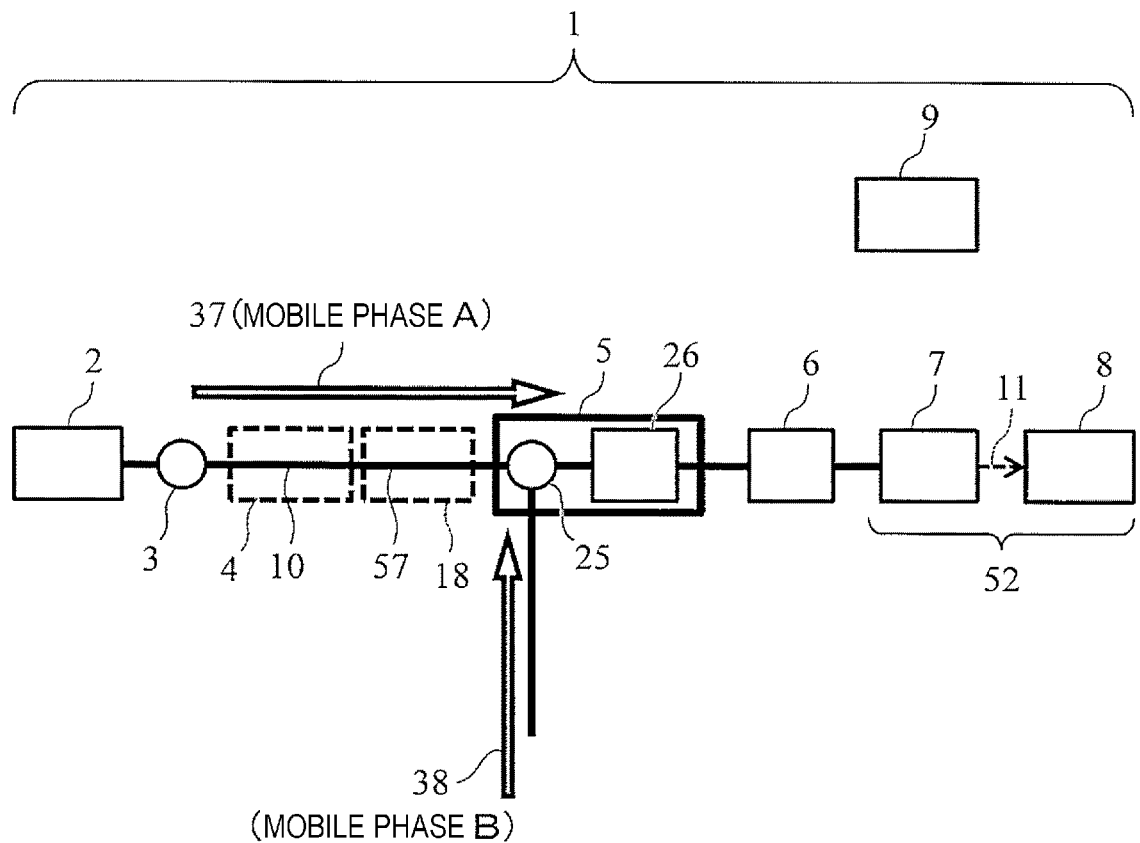
FIG. 14 is a schematic diagram showing a configuration example of the sample fragmentation device.

This problem can be eliminated when the sample fragmentation device has a configuration, for example, as shown in FIG. 14. The configuration of the sample fragmentation device 1 of FIG. 14 is almost the same as those of FIG. 1 and FIG. 5, and thus the explanation will be made only for the differences. The configuration of FIG. 14 is characterized by including the flow path selector valve 25 and the conductance regulating unit 26 in the pressure regulating unit 5, and by the flow path selector valve 25, a mobile phase is fed from different flow paths between the adsorption step and the elution step. That is, the flow path selector valve 25 switches the flow path connected to the inflow side of the separation column 6 between a flow path that passes through the heating unit 4 and a flow path that does not pass through the heating unit 4.

Figure 15:
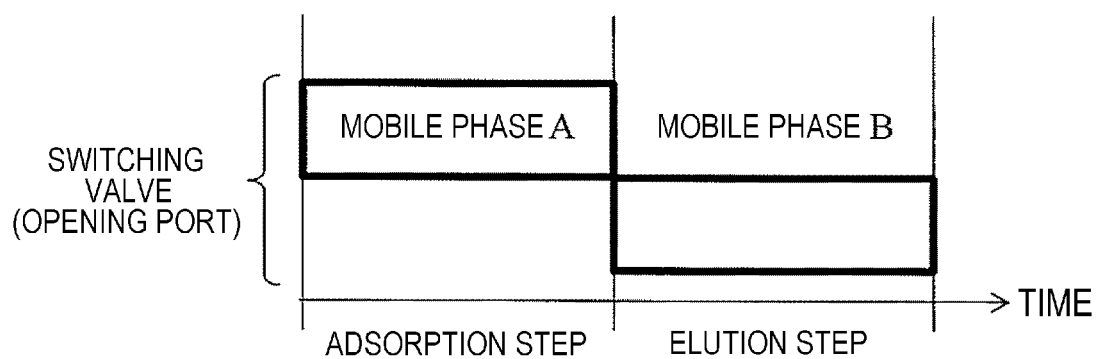
FIG. 15 is a diagram showing a time sequence of an analysis.

As shown in the time sequence of FIG. 15, in the adsorption step, the flow path selector valve 25 is controlled so that the mobile phase A flows from an arrow 37 direction through the heating unit 4 to the separation column 6 side, and in the elution step, the flow path selector valve 25 is controlled so that the mobile phase B flows from an arrow 38 direction, without passing through the heating unit 4, to the separation column 6 side. In this manner, control is made by switching the flow path selector valve 25 depending on the elapsed time from the start of feeding a sample by the liquid feeding pump 2, and thus the mobile phase B having a lower boiling point can be introduced from a flow path that is not heated, whereby an instable operation in elution can be prevented.

Incidentally, although FIG. 14 shows a configuration in which the flow path selector valve 25 is placed as a previous stage of the conductance regulating unit 26, the same effect is achieved even when the flow path selector valve 25 is placed as a subsequent stage of the conductance regulating unit 26.

EXAMPLE 5

Figure 16:
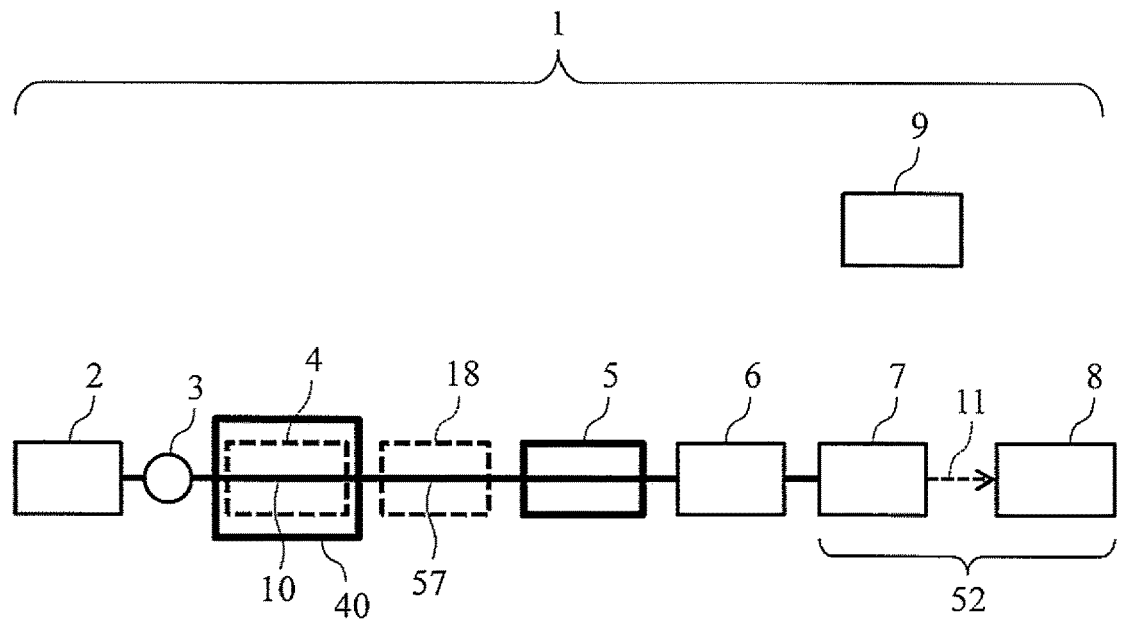
FIG. 16 is a schematic diagram showing a configuration example of the sample fragmentation device.

FIG. 16 is a schematic diagram showing a configuration example of the sample fragmentation device 1 of Example 5. In this example, a configuration of a sample fragmentation device including a cooling unit for cooling a heated pipe in a flow path system will be explained.

The device configuration of FIG. 16 is almost the same as those of FIG. 1 and FIG. 5, and thus explanation is made only for differences. The configuration shown in FIG. 16 is characterized in that a cooling unit 40 for cooling the heated pipe 10 is provided together in the heating unit 4.

Figure 17:
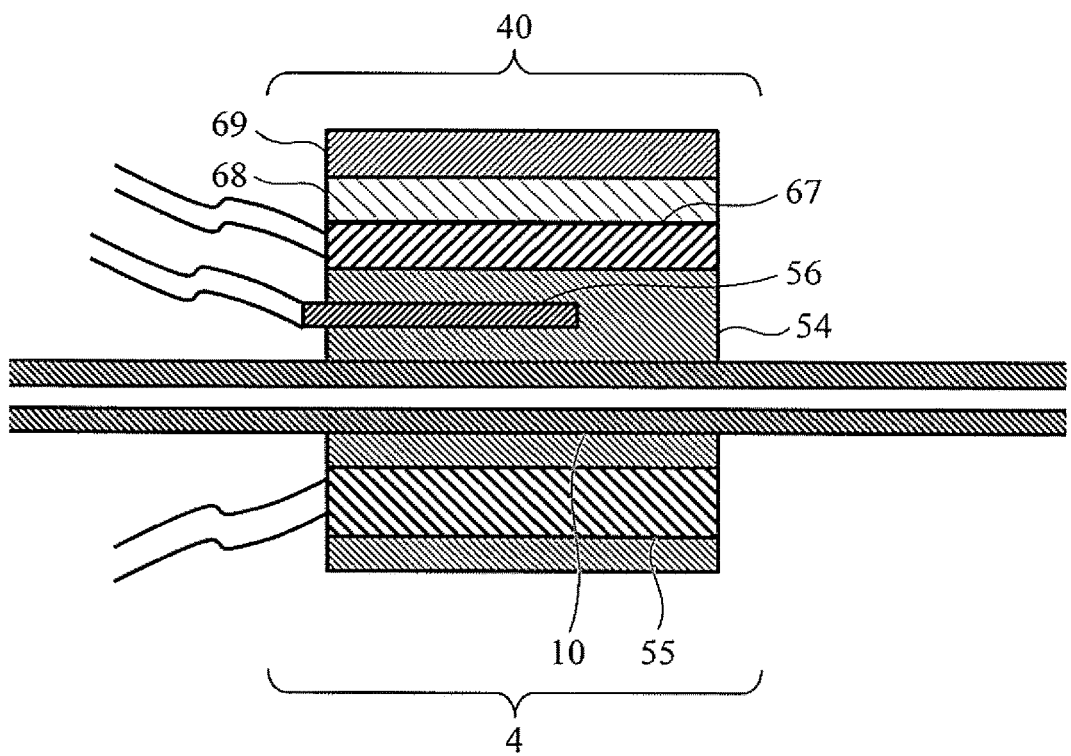
FIG. 17 is a cross-sectional schematic diagram showing a configuration example in which the cooling unit is provided together in the heating unit.

FIG. 17 is a cross-sectional schematic diagram showing a configuration example in which a cooling unit 40 is provided together in the heating unit 4. The heating mechanism of the heating unit 4 is almost the same as in FIG. 2, and thus the explanation is omitted. For rapidly cooling the heating block 54 to cool the heated pipe 10 heated by the heating block 54, a Peltier device 67 is placed. For dissipating heat in the Peltier device 67, a heat sink 68 and a fan 69 are preferably provided. Incidentally, besides the Peltier device 67, the same effect can also be achieved by using another configuration, such as a configuration as in a water jacket and a configuration in which a cooling fan directly cools the heated pipe, as long as it can cool the heated pipe 10.

Figure 18:
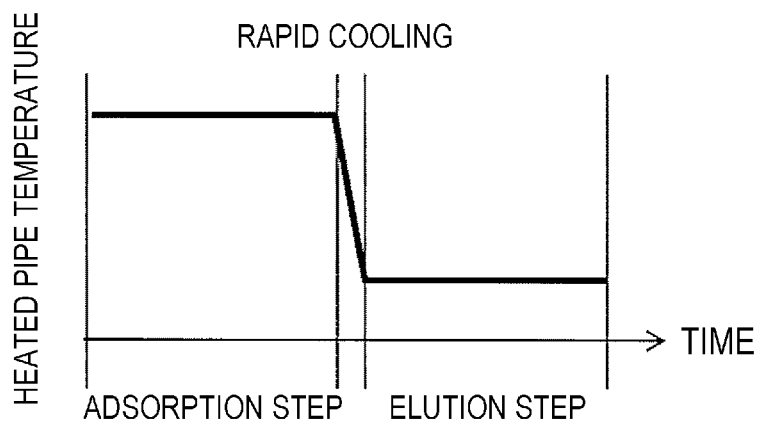
FIG. 18 is a diagram showing a time sequence of an analysis.

The same effect as in Example 4 can be achieved also by this example. As shown in a time sequence of FIG. 18, by rapidly lowering the temperature of the heated pipe 10 heated by the heating unit 4 with the cooling unit 40 to a temperature of the boiling point of a solvent for elution or lower between an adsorption step in which a sample is adsorbed onto a separation column and an elution step in which the sample adsorbed on the separation column is eluted with the solvent for elution, it is possible to prevent boiling of the mobile phase (solvent for elution) in the elution step.

EXAMPLE 6

In Example 6, configuration of a sample fragmentation device in which in a flow path system, a pressure of a heated pipe is controlled by a pressure regulating unit between an adsorption step and an elution step will be explained. The device configuration can be applied in all the examples described above, and thus explanation will be made only for characteristics of this example.

Figure 19:
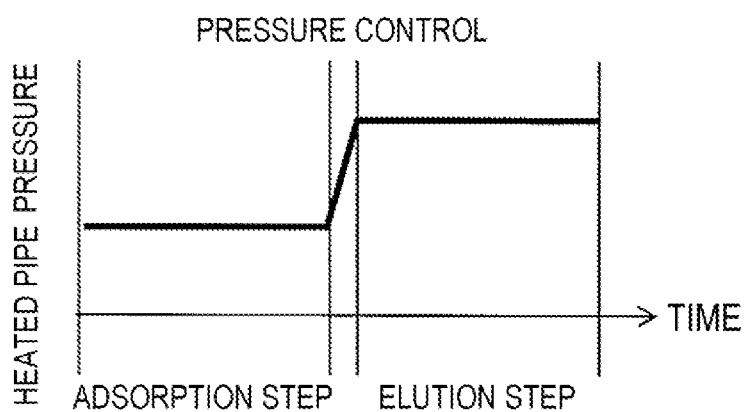
FIG. 19 is a diagram showing a time sequence of an analysis.

FIG. 19 is a diagram showing a time sequence of this example. After completion of an adsorption step of a sample onto a separation column with a mobile phase A and before start of an elution step for eluting the sample adsorbed on the separation column with a solvent for elution having a lower boiling point than the mobile phase A, that is, a mobile phase B, the pressure regulating unit 5 is controlled by the controlling unit 9 to increase the inner pressure of the heated pipe 10.

The same effect as in Example 4 and Example 5 can also be achieved by this example. As shown in a time sequence of FIG. 19, by increasing the inner pressure of the heated pipe 10 by the pressure regulating unit 5 between the adsorption step and the elution step, it is possible to increase the boiling point of the mobile phase in the elution step to prevent boiling of the mobile phase.

EXAMPLE 7

Figure 20:
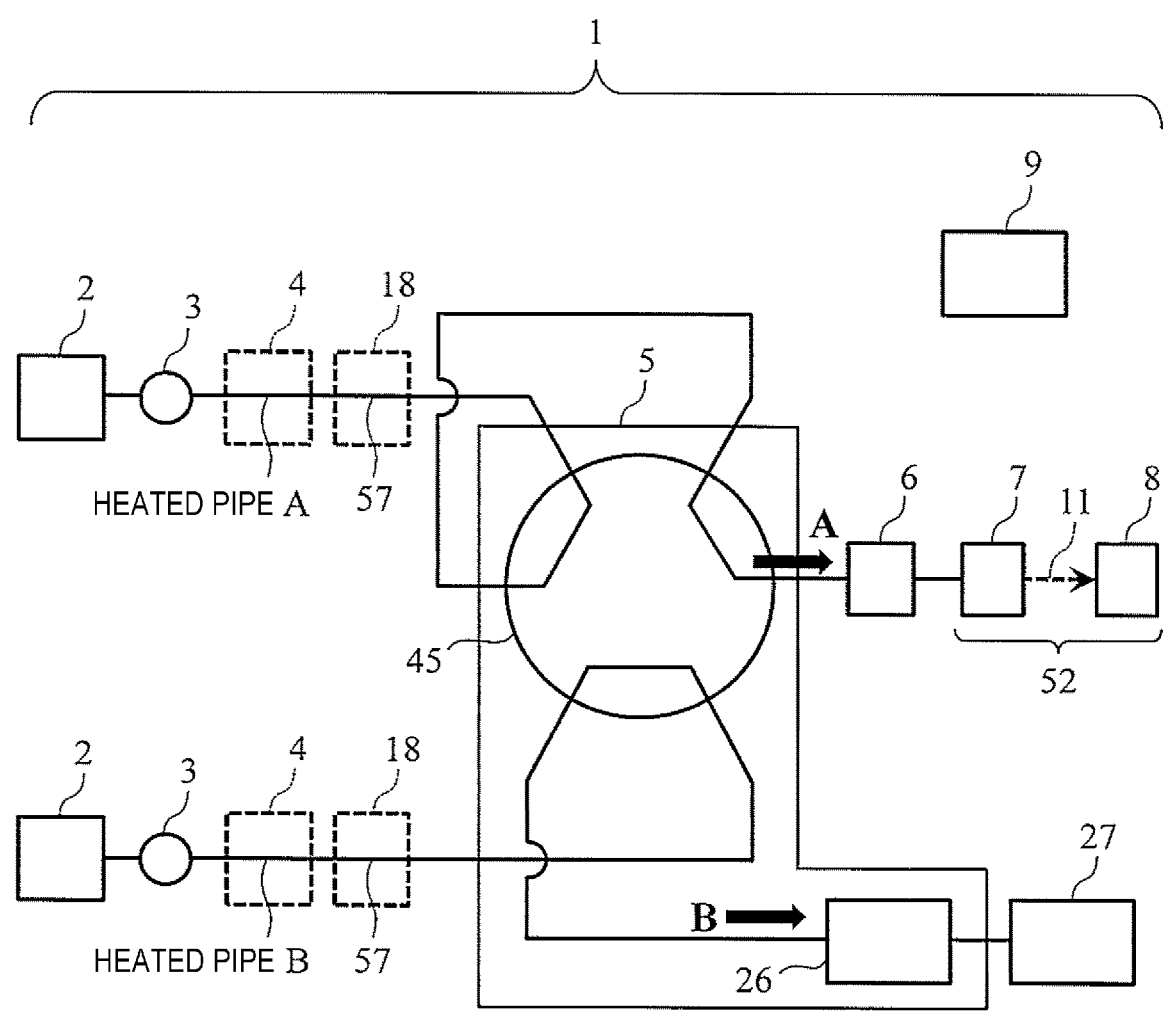
FIG. 20 is a schematic diagram showing a configuration example of the sample fragmentation device.
Figure 21:
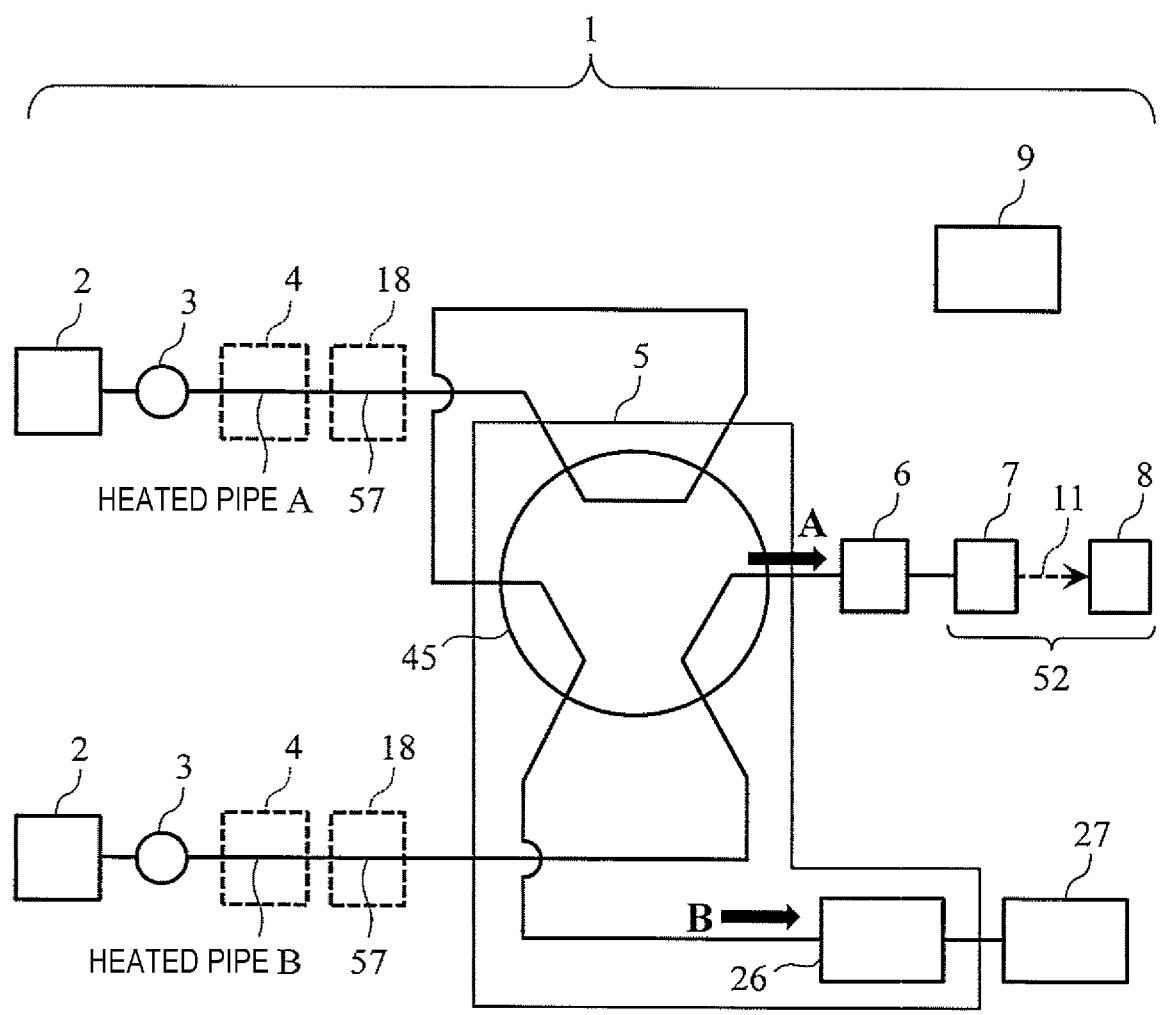
FIG. 21 is a schematic diagram showing a configuration example of the sample fragmentation device.

FIG. 20 and FIG. 21 are schematic diagrams showing a configuration example of the sample fragmentation device 1 of Example 7. In this example, a configuration example will be explained in which a plurality of heated pipes are provided in a flow path system of a sample fragmentation device, and fragmentations of a sample by hydrolysis are conducted in parallel.

The operation principle of this example is almost the same as the operation principle shown in FIG. 10, and thus explanation is made only for differences. The configuration of this example is characterized by including a six-way valve 45 and the conductance regulating unit 26 in the pressure regulating unit 5. FIG. 20 and FIG. 21 each show a connection state of the flow paths when the six-way valve 45 is switched. The six-way valve 45 is the same as the flow path selector valve 25 of FIG. 10 in terms of the function of switching flow paths, but by using the six-way valve 45, the device can be applied to a plurality of heated pipes (heated pipe A and heated pipe B).

Figure 22:
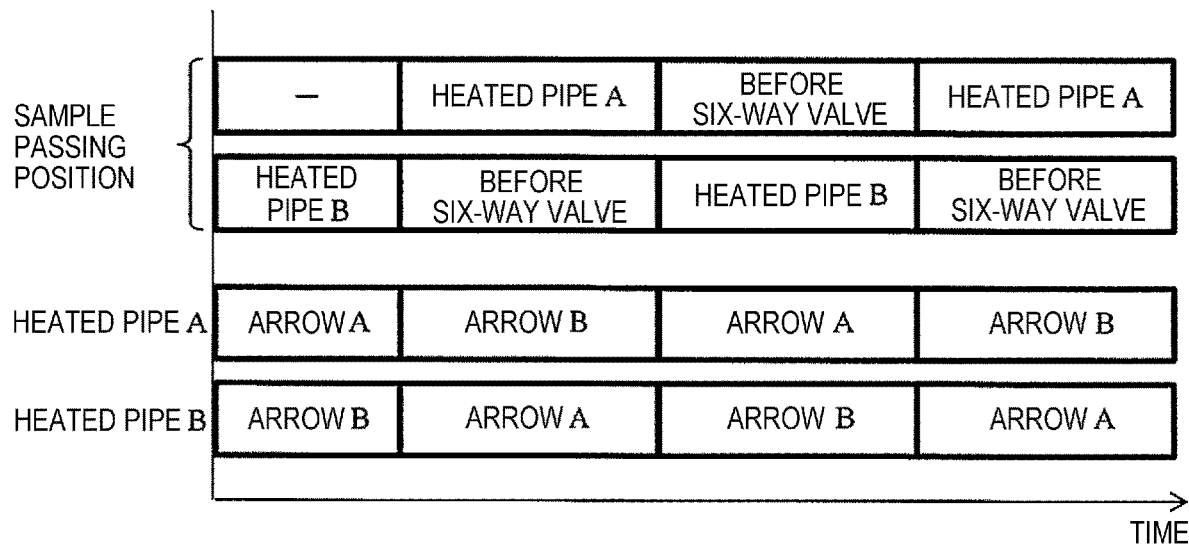
FIG. 22 is a diagram showing a time sequence of an analysis.

An operation of this example will be explained with reference to FIG. 20 and FIG. 21, and a time sequence of FIG. 22.

A sample is introduced into two lines of the heated pipe A and the heated pipe B by the liquid feeding pumps 2 and the sample injectors 3. FIG. 20 shows a state in which the heated pipe A is connected to the separation column 6 side via the six-way valve 45 and a mobile phase on the heated pipe A side flows along an arrow A. On the other hand, the heated pipe B is connected to the conductance regulating unit 26 side via the six-way valve 45 and a mobile phase on the heated pipe B side flows along an arrow B. At this time, the heated pipe B is controlled to an optimal pressure condition by the conductance regulating unit 26, and the sample is hydrolyzed in the heated pipe B in the heating unit controlled in the pressure.

After the sample passes through the heated pipe B, the six-way valve 45 is switched. By switching the six-way valve 45, the heated pipe B is connected to the separation column 6 side as shown in FIG. 21, and the mobile phase on the heated pipe B side flows through the separation column 6 along the arrow A. On the other hand, the heated pipe A is in turn connected to the conductance regulating unit 26 side, and the mobile phase on the heated pipe A side flows along the arrow B. At this time, the heated pipe A is controlled at an optimal pressure condition by the conductance regulating unit 26, and the sample is hydrolyzed in the heated pipe A in the heating unit controlled in the pressure.

In other words, when the sample is passing through the heated pipe A, the mobile phase from the heated pipe A flows toward the conductance regulating unit 26 along the arrow B, and the mobile phase from the heated pipe B flows toward the separation column 6 along the arrow A. On the other hand, when the sample is passing through the heated pipe B, the mobile phase from the heated pipe B flows toward the conductance regulating unit 26 along the arrow B, and the mobile phase from the heated pipe A flows toward the separation column 6 along the arrow A (FIG. 22). With an operation in which a plurality of flow paths connected to the heating units 4 are sequentially switched to the separation column 6 and to the conductance regulating unit 26 by the six-way valve 45, it is possible to perform fragmentation processes of a sample in parallel by a plurality of heated pipes.

Incidentally, although an example in which a plurality of the liquid feeding pumps 2 and a plurality of the sample injectors 3 are used was explained in this example, a plurality of flow path systems may share one liquid feeding pump 2 and one sample injector 3 and a flow path may be divided from the sample injector to introduce a sample into the heated pipe A and the heated pipe B.

EXAMPLE 8

Figure 23:
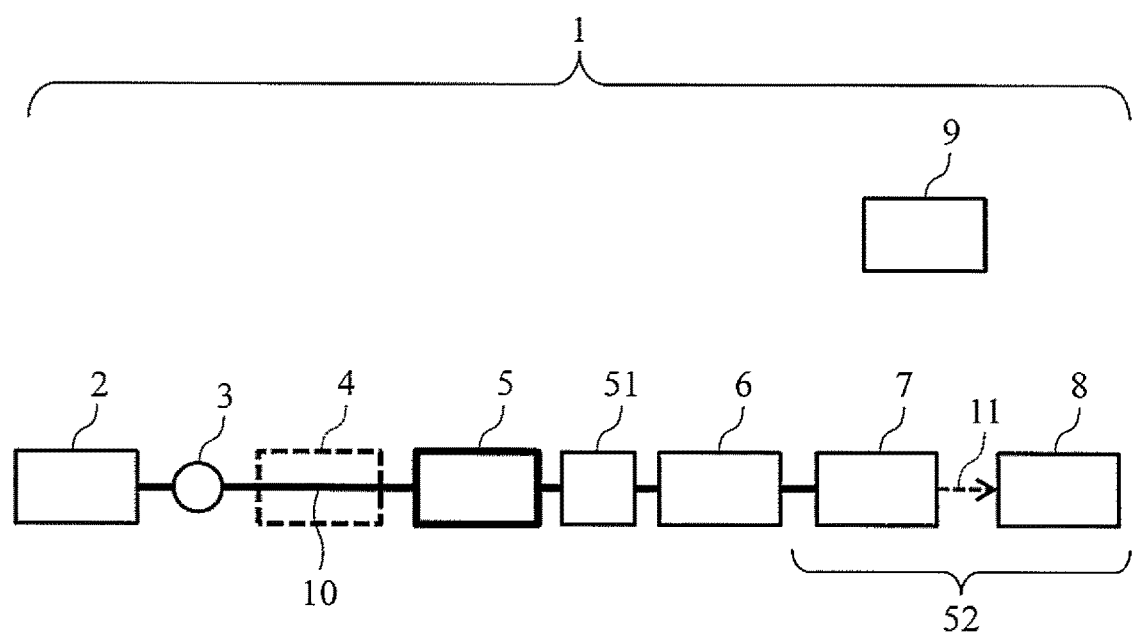
FIG. 23 is a schematic diagram showing a configuration example of the sample fragmentation device.

FIG. 23 is a schematic diagram showing a configuration example of the sample fragmentation device 1 of Example 8. In this example, a configuration of a sample fragmentation device including a filter before a separation column in a flow path will be explained.

The device configuration of FIG. 23 is almost the same as that of FIG. 1, and thus explanation is made only for differences. The configuration of FIG. 23 is characterized in that a filter 51 is provided before the separation column 6.

In fragmentation of a protein or a peptide, an insoluble substance is sometimes produced due to denaturation. The insoluble substance is hardly dissolved in a mobile phase, and thus is possibly not able to pass packing in the separation column 6, resulting in clogging. The clogging of the separation column 6 not only abnormally increases the pressure in a flow path, but may also reduce the service life of the separation column 6.

In this example, by placing the filter 51 as a previous stage of the separation column 6, introduction of an insoluble substance which is possibly produced in the heated pipe 10 into the separation column 6 can be inhibited. As the filter 51, a guard column, a pre-column filter, or the like can be used. In addition, the filter 51 may also be used for the pressure regulating unit 5 and for the conductance regulating unit 26.

EXAMPLE 9

Figure 24:
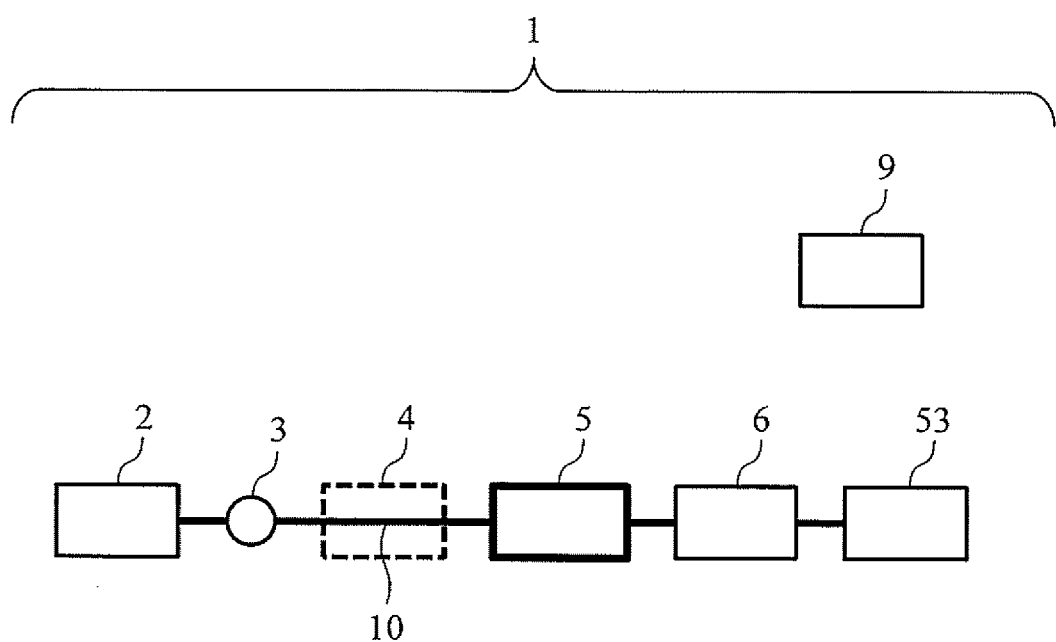
FIG. 24 is a schematic diagram showing a configuration example of the sample fragmentation device.

FIG. 24 is a schematic diagram showing a configuration example of the sample fragmentation device 1 of Example 9. In this example, a configuration of a sample fragmentation device in which an ultra-violet/visible light absorbance detector is used as a detector will be explained.

The configuration of FIG. 24 is almost the same as that of FIG. 1, and thus explanation will be made only for differences. The configuration of FIG. 24 is characterized in that an ultra-violet/visible light absorbance detector 53 is used as a detector.

By using the ultra-violet/visible light absorbance detector 53, the device can be applied to a sample with a large ion suppression, a sample with a low ionization efficiency, or the like in analysis by mass spectrometry.

Incidentally, the present invention is not limited to the examples described above and includes various modified examples. For example, the examples described above were explained in detail for explaining the present invention in an easy-to-understand manner, and the present invention is not necessarily limited to examples including all the configurations explained above. A part of a configuration of one example may be replaced with a configuration of another example, and a configuration of one example may be added to a configuration of another example. A part of a configuration of each example may be added to, deleted from, and replaced with another configuration. As the detector, various detection methods, such as a mass spectroscopy method and an ultra-violet/visible light detection method, as well as a photodiode array detector and a fluorescence detector can be used.

REFERENCE SIGNS LIST 1 sample fragmentation device
2 liquid feeding pump
3 sample injector
4 heating unit
5 pressure regulating unit
6 separation column
7 ion source
8 mass spectrometer
9 controlling unit
10 heated pipe
11 ions
18 cooling unit
25 flow path selector valve
26 conductance regulating unit
27 discharging unit
40 cooling unit
45 six-way valve
51 filter
52 detector
53 ultra-violet/visible light absorbance detector
54 heating block
55 heater
56 thermocouple
57 pipe
58 liquid
59 container
62 thermocouple
63 heater
67 Peltier device
68 heat sink
69 fan

The invention claimed is:

1. A sample fragmentation device for providing fragmented samples for mass spectrometry, comprising
   a liquid feeding pump, a sample injector, and a separation column that are connected via pipes,
   a heating unit for fragmenting the liquid sample flowing through the pipe, disposed between the sample injector and the separation column,
   a pressure regulating unit provided between the heating unit and the separation column for regulating the inner pressure of the pipe heated by the heating unit, and
   a cooling unit disposed on a pipe for cooling the pipe heated by the heating unit,
   wherein the cooling unit is disposed on and in contact with the heating unit to cool the heating unit thereby cooling the pipe, and
   wherein the pressure regulating unit is provided with a flow path selector valve and a conductance regulating unit, and the flow path selector valve switches between a flow path that passes through the heating unit and is connected to the separation column and a separate flow path that does not pass through the heating unit and is connected to the separation column.

2. The sample fragmentation device according to claim 1, wherein the pressure regulating unit is provided with a flow path selector valve and a conductance regulating unit, and the flow path selector valve switches a flow path connected to the heating unit between the separation column and the conductance regulating unit.

3. The sample fragmentation device according to claim 2, comprising a plurality of pipes provided with the heating units, wherein the flow path selector valve sequentially switches flow paths connected to a plurality of heating units to the separation column and to the conductance regulating unit.

4. The sample fragmentation device according to claim 1, wherein the cooling unit includes a jacket housing a liquid and an inlet and an outlet to circulate the liquid.

5. The sample fragmentation device according to claim 1, wherein a Peltier device is disposed on a heat block of the heating unit and a heat sink is disposed between a fan and the Peltier device.

* * * * *